Figure 1:
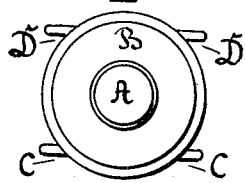

E. C. WALDORF.
EGG TESTER.
APPLICATION FILED NOV. 4, 1907.

904,238.

Patented Nov. 17, 1908.

WITNESSES:
Silas J. Douglass
Ferd. Rebhan

INVENTOR
Eugene C. Waldorf

UNITED STATES PATENT OFFICE.

EUGENE C. WALDORF, OF BUFFALO, NEW YORK.

EGG-TESTER.

No. 904,238.    Specification of Letters Patent.    Patented Nov. 17, 1908.

Application filed November 4, 1907. Serial No. 400,728.

*To all whom it may concern:*

Be it known that I, EUGENE C. WALDORF, a citizen of the United States, residing at the city of Buffalo, in the county of Erie and State of New York, have invented a new and useful Improvement in Methods of and Apparatus for Testing Eggs.

My invention relates to egg "testing" methods and devices, and the object of my invention is to produce a more accurate and desirable method and means for ascertaining the approximate ages and relative conditions of eggs.

I accomplish the objects of my invention in the manner and by the means hereinafter disclosed and illustrated in the accompanying drawings, whereby I am enabled to ascertain the approximate age and quality of an egg more positively, and more accurately, than is now possible by any of the means or methods heretofore used or known.

In my investigations and experiments, I have found that the specific gravity of an egg immediately after it has been laid by a hen is greater than that of a liquid, as for instance, water; and that it is greater then than at any time thereafter, and for the reason that each day thereafter the tendency of the egg is to lose in weight and become lighter each day, if left exposed to the air. Consequently the egg, when first laid, sinks in water with greater force than it will after it has been exposed for some time to the action of the atmosphere, and for this reason, the different positions assumed by eggs and egg-tester holding them when placed in water, as indicated, will indicate by reason of their specific gravity the relative ages and qualities of each egg. Such being the case, I have devised an egg holder adapted to retain the egg when immersed in a liquid, and to register its relative position in that liquid; consequently, by my method, and with my device, one is enabled to grade or separate eggs by their specific gravity into different classes, or a series of classes, so that all eggs in each class, will be very nearly the same age and same relative quality.

By actual experiment in the commission houses, I have found that the so called "candling" process in many cases, fails to show which eggs are "good" and which eggs are "bad", that is to say I have found that from 5 to 20% of the eggs "candled" by the "candling" process now in vogue, and discarded as "bad" eggs are equally as good as those which that process shows to be "good", for the reason that the shells of some eggs fail to permit of the passage of light in the same relative proportion as others, and consequently, such an egg, when candled, will show up "dark and cloudy", and it will be cast aside as a "bad" egg, when in fact, its specific gravity, its age, and its quality, is the same as one shown by the candling process to be "clear" and "good"; consequently, by my method, the commission man is enabled to effect a saving of from 5 to 20 per cent. in the number of his eggs, which would be by the candling process, thrown out as "bad", besides, he is enabled to positively classify his eggs according to quality, and thereby obtain prices for them in accordance with their relative values.

I have also found, by experiment, with my process and device, that a percentage of the eggs shown by the candling process, to be clear and therefore called "good", are really "bad" eggs. They are eggs that are transparent and to the eye, as seen by the candling process, seem perfectly good, but by my process and with my device, they are shown to have lost in specific gravity (also the formation of certain abnormal gases), and upon being used are found to be utterly unfit for use, and to ruin the other material to which they have been added.

I have also found that a device adapted for use, as an egg holder and tester, in my process of testing eggs, may be constructed in various ways, and still accomplish good results.

Figure 4:
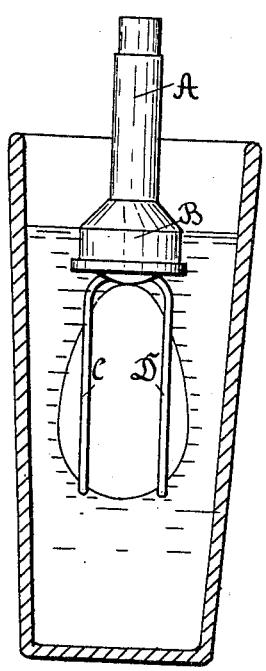
Figure 2:
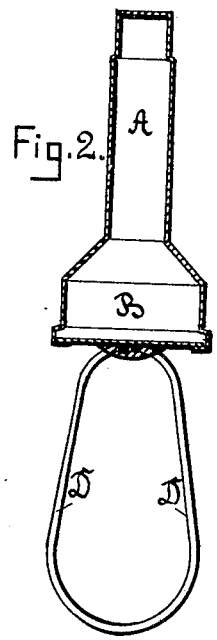
Figure 5:
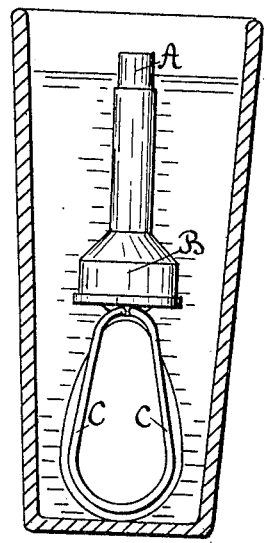
Figure 3:
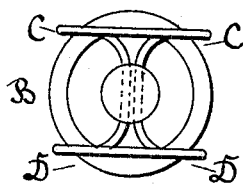

In the accompanying drawing, the like letters of reference, refer to like parts in each figure, and Figure 1 is a top plan view of the tester and holder, Fig. 2 is a horizontal sectional view, and Fig. 3 is a plan view of the tester, when the bottom end is upward. Fig. 4 is a longitudinal sectional view of a vessel containing a liquid preferably water in which is placed my new tester and holder, having embraced within the retaining wires a "bad" egg, and Fig. 5 is a like view showing the tester body portion in section and in the position it will assume when the egg within the retaining wires is a "best" egg of merchantable quality.

The device here shown has been used very successfully by myself and others and is composed of a light hollow body portion A, having a broad base portion B to which is secured bits of spring wire C, and D, adapted to yield to pressure and be separated so as to permit of an egg being inserted in the space indicated, when they clamp the egg and retain it in the position desired, all in a manner well known.

In my process of testing, when an egg has been inserted within the retaining wires, as indicated, it is immersed in water of sufficient depth to permit the egg to settle therein to a depth equal, at least, to the length of the egg tester and holder. If the egg inserted is of the best quality, it will drag the egg tester down nearly its full length and to the point indicated in Fig. 5 of the drawing. If the egg inserted is a bad egg, it will settle only slightly in the water as indicated in Fig. 4 of the drawing. Eggs that are of varying ages and qualities between the best egg and the bad one, will when immersed in water, sink in the water in accordance to their respective ages and qualities and may be, therefore, graded according to the depth reached in the water.

What I claim and desire to secure by Letters Patent of the United States is:

1. In egg testing devices an egg holder having a body portion adapted to float upon water, and broader at its base than at its top, and provided with retaining wires secured to its base, and adapted to receive an egg and retain it in position below the base of the body, as shown and described, and for the purpose set forth.

2. In egg testing devices, an egg holder consisting of a light body portion adapted to rise to the surface of water, when immersed therein, and a retaining device provided with means whereby a single egg can be secured in position immediately adjacent to the body portion, all as and for the purposes set forth.

EUGENE C. WALDORF.

In presence of—
  SILAS J. DOUGLASS,
  FERD. REBHAN.